US005739005A

United States Patent [19]

Rodriguez-Kabana et al.

[11] Patent Number: 5,739,005

[45] Date of Patent: Apr. 14, 1998

[54] USE OF POLYMERIC FILMS FOR DELIVERY OF NEMATODE EGGS AND ECOLOGICAL EVALUATIONS

[75] Inventors: Rodrigo Rodriguez-Kabana; Nancy Kokalis-Burelle, both of Auburn, Ala.

[73] Assignee: Auburn University a Public University of the State of Alabama, Auburn, Ala.

[21] Appl. No.: 405,788

[22] Filed: Mar. 17, 1995

[51] Int. Cl.[6] .................... C12Q 1/08

[52] U.S. Cl. .................... 435/40.5; 435/240.23; 424/493; 424/408; 424/485; 119/67; 116/89

[58] Field of Search .................... 435/40.5, 240.23; 424/493, 408, 485; 119/67; 116/89

[56] References Cited

U.S. PATENT DOCUMENTS

| | | | |
|---|---|---|---|
| 3,541,203 | 11/1970 | Fogle et al. | 424/17 |
| 3,623,937 | 11/1971 | Gasaway | 161/89 |
| 3,767,790 | 10/1973 | Guttag | 424/81 |
| 3,893,642 | 7/1975 | Van Vlaenderen | 245/2 |
| 4,160,335 | 7/1979 | Von Kohorn et al. | 43/131 |
| 4,202,905 | 5/1980 | Asai et al. | 426/1 |
| 4,298,002 | 11/1981 | Ronel et al. | 128/260 |
| 4,391,909 | 7/1983 | Lim . | |
| 4,409,331 | 10/1983 | Lim | 435/178 |
| 4,417,545 | 11/1983 | Finney | 119/1 |
| 4,434,231 | 2/1984 | Jung | 435/253 |
| 4,589,226 | 5/1986 | Stensaas | 47/58 |
| 4,753,799 | 6/1988 | Nelson et al. | 424/408 |
| 4,756,835 | 7/1988 | Wilson | 210/651 |
| 4,765,275 | 8/1988 | Yukawa et al. | 119/15 |
| 4,765,982 | 8/1988 | Ronning et al. | 424/403 |
| 4,774,093 | 9/1988 | Prouonchee et al. | 424/493 |
| 4,806,355 | 2/1989 | Goosen et al. | 424/424 |
| 4,859,377 | 8/1989 | Shasha et al. | 264/4.1 |
| 4,990,551 | 2/1991 | Häubl et al. | 524/30 |
| 5,170,744 | 12/1992 | Pruitt et al. | 119/6.7 |
| 5,172,514 | 12/1992 | Weber et al. | 43/132.1 |
| 5,238,681 | 8/1993 | Chang et al. | 424/405 |
| 5,248,500 | 9/1993 | Ayanaba | 424/93 |
| 5,264,210 | 11/1993 | Novitski et al. | 424/93 |
| 5,266,476 | 11/1993 | Sussman et al. | 435/240.23 |
| 5,277,915 | 1/1994 | Prouonchee et al. | 424/485 |
| 5,288,488 | 2/1994 | Backman | 424/93 |
| 5,314,691 | 5/1994 | Coffey et al. | 424/93 |
| 5,334,229 | 8/1994 | Sakamoto | 47/57.6 |
| 5,360,607 | 11/1994 | Eyal et al. | 424/93.5 |
| 5,401,506 | 3/1995 | Chang et al. | 424/408 |

OTHER PUBLICATIONS

Haywood, J.D; New Forests, Apr. 1994, vol. 8(2), pp. 143–154.

Rodriguez-Kabana et al, Plant and Soil, vol. 164; 1994, pp. 147–154.

Rodriguez-Kabana et al, Nematropica, Dec. 1990, vol. 20(2) pp. 153–168.

Bird, A et al; Observations on The Use of Insect Parasitic Nematodes as a Means of Biological Control of Root-Knot Nematodes; Int'l J. for Parasitology, vol. 16, #5, pp. 511–516, 1986.

Johansen, A et al; Enzyme Microb. Technol. 1986, 0018, Dec. Influence of Alginate Properties and Gel Reinforcement on Firmentation Characteristics of Immobulized Yeast Cells; pp. 737–748.

Rudolf Endreb, Plant Cell Biotechnology, 1994, Published by Springer-Verlag, pp. 256–269, Chapter 7.

Mattiasson; Bo. Imomobilized Cells and Organelles, vol. 2, 1983, CRC Press Inc., pp. 133–144, Chapter 8.

*Primary Examiner*—James C. Housel

*Assistant Examiner*—Ginny Allen Portner

*Attorney, Agent, or Firm*—Burns, Doane, Swecker and Mathis

[57] ABSTRACT

Provided is a polymer film useful in the delivery of biological agents, as well as a method for making such a polymer film. The polymer film comprises a transparent, gelled water-soluble polymer supported by a mesh. The polymer film also contains a biological agent. The polymer film can be made by preparing an aqueous solution of a gellable water-soluble polymer and the biological agent, dipping the meshed support into the aqueous solution to create a liquid film over the support, and then gelling the polymer.

23 Claims, 2 Drawing Sheets

A → 2% alginate containing M. incognita eggs

B → Pull through glass rods (Side View)

C → 0.25M CaCl₂ Dip 3-5 sec.

D → H₂O Wash 3 times in H₂O

USE OF POLYMERIC FILMS FOR DELIVERY OF NEMATODE EGGS AND ECOLOGICAL EVALUATIONS

BACKGROUND OF THE INVENTION

The present invention relates to a novel means of delivering biological agents to a desired location. More specifically, the present invention relates to a polymer film useful in delivering such biological agents. In particular, the polymer film can be used to deliver biological agents for ecological evaluations.

Development of plant parasitic nematode populations in soil is regulated by numerous antagonistic microorganisms. There are species of bacteria and fungi in soil that are capable of destroying nematode eggs and other developmental stages. The relative abundance of antagonists in soil may determine whether a phytonematode species can develop in sufficient numbers to cause significant damage to crops. The measurement of the capacity of soils to restrict development of phytonematode populations is an essential component for the use of biological control in the management of plant parasitic nematodes. The use of agar disks to measure the antagonistic capacity of soils against root-knot (*Meloidogyne* spp.) eggs has been proposed. The technique, however, is effective but cumbersome. The disks are difficult to prepare and the thickness of the disks impair rapid and precise microscopic observations.

Alginates obtained from seaweed have been used for decades as food additives to improve the shelf life and quality of foods. Aqueous solutions of sodium alginate and other univalent cation salts of alginic acid form a gel when in contact with calcium or several other divalent cations. This property has been used to prepare beads containing microbial and nematode inocula, enzymes, and various substrates. The current technology for delivery of organisms through alginate beads or microspheres, however, does not permit microscopic observation or precise placement of microorganisms or compounds.

Therefore, there is need for a better means and method for delivering biological agents/organisms and for evaluating the effect achieved. Such an improved method and means would be greatly beneficial for the agricultural, medical and biotechnology industries.

Accordingly, it is an object of the present invention to provide an improved vehicle for delivery of biological agents.

It is another object of the present invention to provide an improved method for evaluating the effects of organisms introduced into an environment.

These and other objects of the present invention will become apparent upon a review of the following specification and claims appended thereto.

SUMMARY OF THE INVENTION

In accordance with the present invention, there is provided a polymer film comprised of a transparent, gelled water-soluble polymer which is supported by a mesh. The film further contains a biological agent. In a preferred embodiment, the mesh is a fiberglass screen, and the gelled water-soluble polymer is an alginate polymer. Such films can be used to deliver biological agents such as nematode eggs, fungal spores, cells, bacteria and seeds. The delivery can be to locations useful in ecological evaluations, e.g., soil samples.

In another embodiment, the present invention relates to a method of making a polymer film useful in the delivery of biological agents. The method comprises preparing an aqueous solution of a gellable water-soluble polymer and a biological agent and then dipping a meshed film support into the aqueous solution to create a liquid film over the support. The polymer is then gelled in order to create a hardened polymer film containing the biological agent. The mesh supported film can then be cut to appropriate sizes for delivery to the desired locations. For example, delivery can be to a particular soil sample or liquid sample, or the polymer film can support the growth of plant roots.

In still another embodiment, the present invention provides one with a useful process for evaluating the microbial interactions of soil on a biological agent. The process involves preparing the polymer film in the present invention and delivering at least a portion of the polymer film into the soil or other medium. How the biological agent is affected by the soil or medium can then be observed.

In effect, the present invention permits agricultural, medical and biotechnology interests to precisely deliver standardized amounts of pathogen inoculum, beneficial microorganisms, antibiotics, etc. for the purpose of producing disease symptoms or assessing effects of treatment on introduced organisms.

DETAILED DESCRIPTION OF THE PREFERRED EMBODIMENTS

Figure 1:
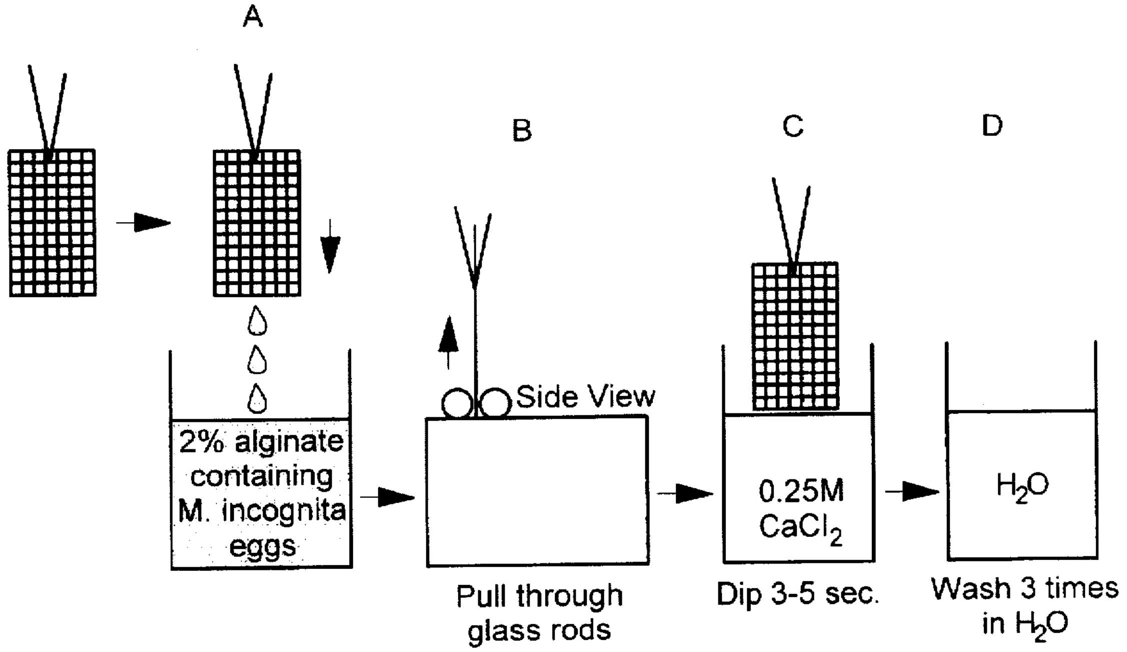
FIG. 1 is a schematic representation of a process useful in preparing the films of the present invention.

The polymer film of the present invention comprises a gelled, water-soluble polymer, or mixture of polymers, which is transparent, thereby permitting a clear microscopic view of the film and its contents. The gelled polymer generally begins as a gellable, water-soluble polymer which is preferably a hydrophilic colloidal polymer such as a polysaccharide. Preferred examples are alginate polymers and carrageenan polymers. Such polymers can be readily gelled. For example, the sodium alginate polymer is water soluble, while the calcium form is a gel. Other suitable polymers which can be used for the purposes of the present invention include polygalacturonic acid, pectins, and mixtures of alginates or polypectates with agar, xanthan, dextrans, gelatin and similar polymers.

The alginate polymer and mixtures involving an alginate polymer are most preferred. Experiments have clearly demonstrated that the gelling properties of water-soluble alginates permit the easy production of films or varying thickness with a support provided by fiberglass screens. These films could be used to deliver nematode or microbial inocula into soil and allow for the recovery and direct observation of the inocula. In contrast with an agar disk or other methods, the films of the present invention would allow for the delivery of precise amounts of nematode or other inoculum to soil for the purpose of producing disease symptoms and also for the measurement of antagonistic activities in a simpler and more accurate manner.

The polymer film is supported with a mesh support. The support is preferably a screen-like support having grids of extremely small size. The size of the mesh in the support is preferably in the range of from about 0.5 to 5.0 $mm^2$ mesh, and most preferably in the range of from about 1.0 to 2.0 $mm^2$ mesh. It is also preferred that the support mesh be free of contaminating substances which may interfere in any evaluation in which the film is used. The mesh may be washed or treated prior to use in the film in order to prevent the presence of such contaminating substances. For example, removal of any oily substances may be warranted to avoid such contamination and may be achieved by careful solvent washing of the mesh support.

Among the most preferred mesh supports for use in the present invention is that of a fiberglass screen. In particular, it is preferred to use a fiberglass screen coated with a suitable inert polymer coating, such as a polyvinyl chloride coating. Other suitable supports which would not contaminate the polymer film can also be used. For example, cellulose, nylon, or polyester screens can be used, or for some applications, screens made of a non-corroding metal such as stainless steel can be used.

The polymer film further contains a biological agent. The biological agent can comprise nematode eggs, fungal spores, cells, bacteria, seeds, etc. Any biological agent can be used which can be involved in an evaluation or study of disease symptoms that the agent may produce or for the assessment of the effects of a treatment on the introduced biological agent/organism.

In general, the polymer films of the present invention permit the delivery in a precisely quantitative manner of the selected biological agents such as nematode eggs, spores and bacteria. While the delivery can be made quite easily into a soil environment, delivery can also be made, depending on the application, into almost any liquid environment or solution, for example, lake waters, swamps, sea water or any air or gaseous environment. With a suitably appropriate gelled polymer, delivery can also be effected to the internal parts of animals.

The films offer the advantage of being able to be stored for prolonged periods (months) and further allow for the direct microscopic observation after burial in soil or immersion in other media in vitro. This precise delivery of a quantitative amount of biological agent would permit a more standardized study with respect to the effects of beneficial microorganisms, antibiotics or pathogens in any of the agricultural, medical or biotechnological fields. Of particular interest is the use of the polymer films of the present invention in the study of the agricultural field, and for the study of the effects that a soil may have on a particular biological agent, the effects that agricultural chemicals may have on biological agents, or the effect the biological agent may very well have on plant roots in the soil.

The polymer films of the present invention can be made by first preparing an aqueous solution of a gellable water-soluble polymer and the biological agent to be delivered. Into the aqueous solution is dipped a meshed support thereby creating a liquid film over the support. The polymer is then gelled to prepare a hardened film containing the biological agent over the support. Once gelled, the film as a unit can be handled easily and cut into various appropriate sizes for delivery of the biological agent.

The amount of polymer generally employed in the aqueous solution when making the polymer film is of a sufficient amount to create a film. Generally, the amount ranges from abut 0.05 to 10 weight percent of the aqueous solution, and more preferably in the range of from about 2 to about 6 weight percent. The amount of polymer will vary depending on the ultimate application, and the specific polymer and biological agent used.

The invention will be illustrated in greater detail by the following specific examples. It is understood that these examples are given byway of illustration and are not meant to limit the disclosure or the claims to follow. All percentages in the examples, and elsewhere in the specification, are by weight unless otherwise specified.

EXAMPLE 1

Preparation of Alginate Films

An alginate solution was prepared by blending medium viscosity sodium alginate (Sigma Chemical Co., St. Louis, U.S.A.) with warm (60° C.) demineralized water in a Waring blender for 10–15 sec. The solution was heated to approximately 80° C. in a microwave oven, and left at room temperature for 3–4 hours until a clear solution free of air bubbles was obtained.

For standard alginate films a 3% (w/v) sodium alginate solution was prepared. The solution was mixed 2:1 (w/v) with an aqueous suspension of *Meloidogyne incognita* eggs to a final alginate concentration of 2%. A cleaned screen was then immersed in the alginate egg suspension, lifted off with forceps, and the excess liquid was allowed to run off. (Step A of FIG. 1) The screen was then pulled slowly through 2 glass rods to produce a film of uniform thickness, dipped in 0.25M $CaCl_2$ for 3–5 seconds to form a solid alginate gel, and rinsed in three consecutive beakers of demineralized water. (Steps B–D of FIG. 1)

Figure 2:
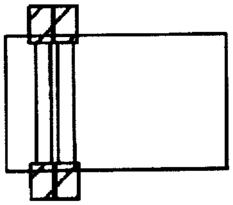
FIG. 2 is a top view of the glass rods used in Step B of the process shown in FIG. 1.
Figure 3:
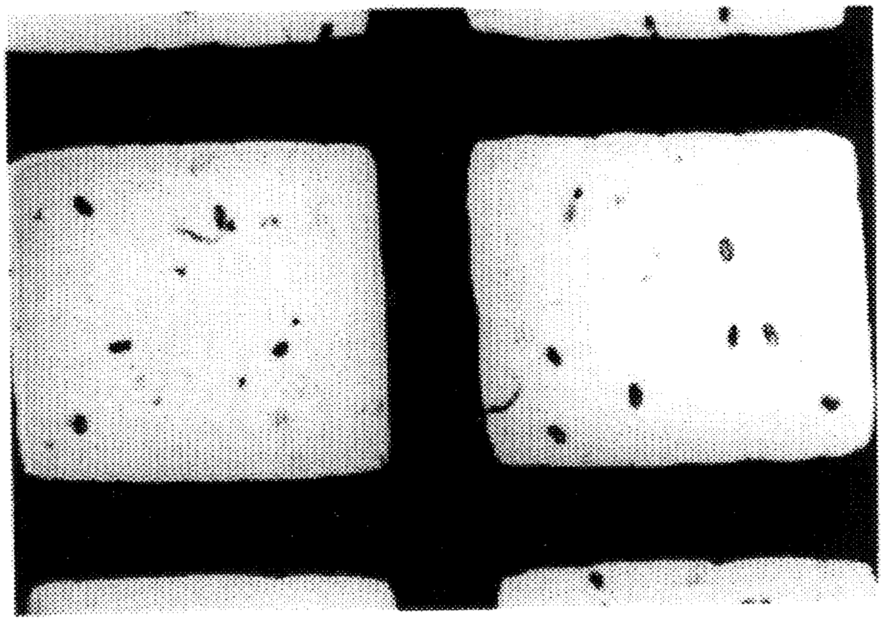
FIG. 3 is a photomicrograph of an alginate film containing nematode eggs.

The thickness of the film was controlled by inserting 2-cm-long pieces of plastic tubing on both ends of glass rods and could be varied by varying the type of tubing used. (See, FIG. 2, which shows a top view of the glass rods). The concentration of the eggs in the aqueous suspension was adjusted to 3–5 eggs per grid square. Alginate films were clear and could be observed directly with a microscope. FIG. 3 is a photomicrograph of the alginate film containing said eggs.

The screen used to support the alginate gel was a commercially available polyvinyl chloride coated fiberglass screen (Phifer Wire Products, Inc., Tuscaloosa, Ala., U.S.A.) with a 1.5 $mm^2$ mesh. The screen was cut to the appropriate size and immersed in petroleum ether for 2 hours followed by 95% methanol overnight to remove oil and stiffen the screen. The treated screen was allowed to dry before use.

Results of preliminary experiments indicate that the final alginate gel can vary in quality depending on the source and viscosity of the alginate used. Sigma alginate solutions produced strong, clear films with a pH=6.8. Treatment of fiberglass screens with petroleum ether and methanol was preferred for removal of oily material, lower surface tension, and improved adhesion of the alginate to the screen.

In general, it was found that alginate films supported on a fiberglass screen were easy to prepare and that they could provide many advantages for the delivery of inoculum and for studying the dynamics of soil organisms over previously described methods.

EXAMPLE 2

Alginate films are also well-suited for studies on egg development, as is shown in the present example. These studies demonstrated that eggs would develop and juveniles could emerge from the film. Quantitative information on egg development was obtained with relative ease. The presence of the fiberglass screen provided a spatial coordinate system where the position of each egg or particle embedded in the film could be precisely determined and recorded for multiple observations. Microscopic observations were made directly on the films.

Extraction of Nematode Eggs

*Meloidogyne incognita* eggs were extracted from "Rutgers" tomato (*Lycopersicon esculentum*) roots using a modification of Hussey's NaClO method (1973). Galled roots were washed and cut into 2–3 cm long pieces. Approximately 20 g of root were homogenized with 100 mL of water for 30 seconds in a Waring blender. The resulting suspension was transferred to a 1 L bottle, water was added to 400 mL and 200 mL of 1.8% NaClO solution was added. The bottle was stoppered, shaken gently for 3 minutes and its contents were poured into a 4-L beaker with 2 L of water. The suspension was then passed successively through 250, 75, and 20 μm mesh stainless steel sieves. The contents of all but the 20 μm sieve were discarded and the eggs retained there were rinsed with water.

In Vitro Experiments. Egg Development

The development of *M. incognita* eggs in alginate films was observed for 9 days. Standard films (2.5×5.0 cm) were prepared to have 5 eggs per grid square. There was a total of 627 squares per screen, and 5 films each were placed in plastic petri dishes with 30 mL of demineralized water. The dishes were kept at room temperature (23±2° C.) and observations were made at 2, 4 and 9 days. At each observation the films were placed on a microscope slide, and the number of immature eggs, eggs with first stage juveniles and empty egg shells (cases) was determined. A total of 20 squares per screen were examined, so that 100 individual observations were made each sampling time. The number of juveniles in each dish was also determined at the 4- and 9-day observations; the water was replaced after the 4-day observation.

To determine the relationship between the number of eggs in films and the number of juveniles emerging from films 1, 2 or 3 standard films were placed in petri dishes containing 30 mL demineralized water. There were 5 replications (dishes) per treatment. After 12 days of incubation at room temperature, the number of juveniles in each dish was determined.

The number of immature eggs and eggs with first stage juveniles declined in an almost linear fashion throughout the study. The numbers of empty egg shells increased sharply during the first 4 days of the experiment but changed little from the 4th day to the 9th day. The average number of juveniles per petri dish was 133 the 4th day and 271 in the 9th day observation. Thus, the total number of juveniles hatched per screen was 404, representing 13.3% of the total number of eggs/screen. The number of juveniles increased directly in proportion to the number of films in each petri dish.

EXAMPLE 3

Figure 4:
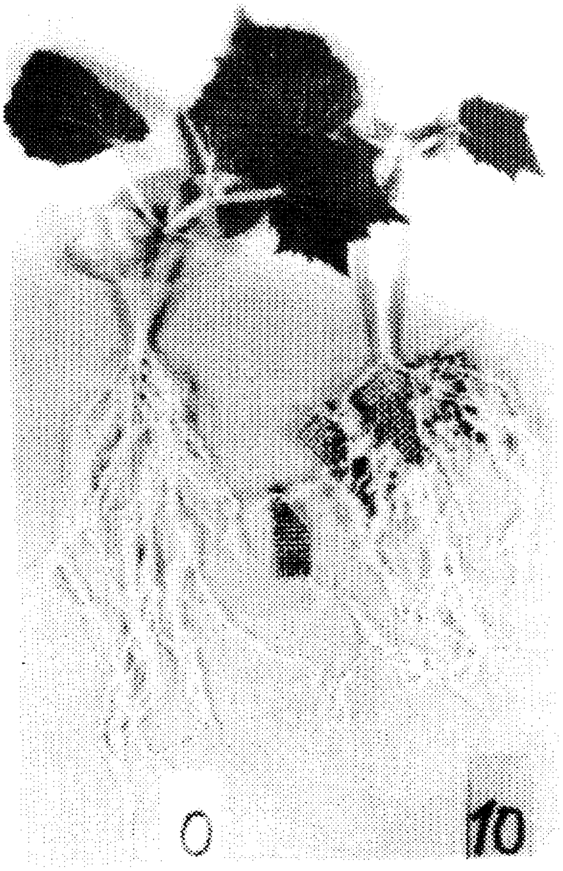
FIG. 4 is a photograph of cucumber roots from a pot inoculated with 10 alginate films and an uninoculated pot.

An experiment was conducted to determine if *M. incognita* eggs contained in alginate films could be used to inoculate "Mervita Sperling" cucumbers (*Cucumis sativus*). A 2.5-cm-wide alginate film strip was prepared and cut into 1×2.5 cm pieces, each with 105 squares and 4–5 eggs/square so that the total number of eggs/piece was 420–525. One-L pots with moist, fine (≦0.2 mm) sterile, builder's sand were planted each with 2 cucumber seeds. Screen pieces were buried in the sand to a depth of 2–3 cm and arranged in a circle with the seeds in the center. Treatments in the experiment were 0, 1, 2, 4, 6, 8, and 10 films/pot. Eight replications per treatment were arranged in randomized complete blocks on a greenhouse table at 20±2° C. After 5 weeks, plants were washed free of sand, the weights of fresh shoots and roots were recorded, and the number of galls was determined. A root-knot index value was assigned following Zeck's scale (Zeck, 1971) where 1 represented no galls and 10 maximal galling. Cucumber roots developed well, penetrating through the films. FIG. 4 is a photograph of cucumber roots from an uninoculated pot (on the left) and from a pot inoculated with 10 alginate films (on the right).

This cucumber experiment demonstrates a good correlation between the amount of inocula and root-galling by *M. incognita*. It is significant that the galls were uniformly distributed through the root system. In our experience inoculations of plants in sand culture with aqueous egg suspensions usually result in downward movement of the eggs when the pots are watered. A major portion of the inoculum is typically lost, and most galls are found in the lower portion of the root system. In this experiment it was noted that alginate film inoculum can be kept moist for long periods (6 weeks) at 8°–12° C., and the eggs remain viable and hatch when the films are placed in water and maintained at 23°–25° C.

EXAMPLE 4

The value of alginate films for observation of microbial activity on *M. incognita* eggs was studied in a greenhouse experiment. A silty clay loam soil (pH=6.8, organic matter<2.0%) was amended with either crustacean chitin (Fluka), flax (*Linum usitassimum*) seed meal or a combination of the two materials. The moist soil was screened (1 mm mesh) and mixed 1:1 (v:v) with sand. The mixture, which will be referred to as soil, was divided into 4 portions. One was left untreated, a second portion received chitin at 10 $g/kg^{-1}$ soil, the third portion was amended with flax seed meal at 10 $g/kg^{-1}$ soil, and the fourth portion received both chitin and flax seed meal each at 10 $g/kg^{-1}$ soil. The flax seed meal was for human consumption (Leinsamen geschrotet, Schneekoppe GmbH, D-4050 Mönchengladbach, Germany) and contained 21% protein and 38% lipids.

The amendments were mixed with the soil using a concrete mixer. Untreated soil and those with amendments were apportioned in 1-kg amounts and transferred to 1-L plastic pots (10-cm-diameter). Pots were arranged in randomized complete blocks on a greenhouse table and maintained moist at 20±2° C. After 4 weeks a 2.5×5 cm film with five *M. incognita* eggs/square was buried in each pot. A 3-cm-wide metal spatula was inserted into the soil and pushed slightly to one side. The screen was placed into the soil which was pressed lightly against the film to seal the hole.

After four days, the films were removed from the soil and washed in running tap water. Soil particles adhering to the screen surface were removed by brushing gently with a soft brush. The films were washed again in demineralized water and placed in covered 250-mL plastic cups with 5 mL of water. Microscopic observations of the films were made within 24 hours after removal from the soil. After observations were completed, the films were placed back into the cups and incubated at room temperature for two weeks when a second observation was made.

In each observation the numbers of immature eggs, eggs with first stage juveniles, empty egg shells, and of parasitized eggs were determined. Parasitized eggs were those that had either mycelium growing out of them, or were vacuolated and abnormal looking, sometimes with signs of egg shell degradation. Twenty squares per screen were counted for a total of 160 observations/treatment.

The data were analyzed according to standard procedures including SAS general linear model, least significant different (LSD), regression analysis, and correlation procedures (SAS, 1991). Unless otherwise stated, all differences were significant at the 5% or lower level of probability.

There were no differences among treatments in numbers of immature eggs, eggs with juveniles or in the number of parasitized eggs 24 hours after removal of the films from soil (Table 1). However, after a two-week incubation period immature eggs in films from pots with chitin or flax seed meal were lower than in those from the untreated control (Table 1). Percent parasitized eggs was highest in films from soils with the amendments (Table 1). Films from pots with flax seed meal alone or with chitin and flax seed meal had higher percent parasitized eggs than those with chitin alone. There were not differences among treatments in eggs with juveniles (Table 1) or in the percent number of empty egg shells (data not shown). Percent eggs with juveniles was 11 times lower at the 2-week observation period than at the first observation.

8. The polymer film of claim 1, wherein the polymer comprises a gelled calcium alginate, and the mesh supporting the polymer film has grids of a size ranging from 1.0 to 2.0 mm$^2$ mesh.

9. A method of making a polymer film useful in the delivery of biological agents which comprises (i) preparing an aqueous solution of a gellable water soluble polymer and a biological agent which comprises nematode eggs;

(ii) dipping a meshed support, the size of the grids of which is in the range of from about 0.5 to 5.0 mm$^2$ mesh, into the aqueous solution to create a livid film over the support, and (iii) gelling the polymer.

10. The method of claim 9, wherein the amount of polymer contained in the aqueous solution is sufficient to create a film over the meshed support.

11. The method of claim 9, wherein the amount of polymer contained in the aqueous solution ranges from about 0.05 to 10 weight percent.

12. The method of claim 9, wherein the gellable water soluble polymer comprises a polysaccharide.

13. The method of claim 12, wherein the polysaccharide is an alginate or carrageenan.

TABLE 1

Effects of chitin and flax seed meal as organic soil amendments on development stages of Meloidogyne incognita eggs embedded in alginate screens and buried in soil

| Treatment | Immature eggs (%) No incubation | Immature eggs (%) 2 Week incubation | Parasitized eggs (%) No incubation | Parasitized eggs (%) 2 Week incubation | Eggs with juveniles (%) No incubation | Eggs with juveniles (%) 2 Week incubation |
|---|---|---|---|---|---|---|
| Control | 65.94 | 51.87 | 3.47 | 6.13 | 30.52 | 4.13 |
| Flax seed meal | 55.99 | 26.00 | 7.82 | 37.13 | 36.15 | 2.25 |
| Chitin | 60.01 | 34.13 | 2.71 | 20.50 | 37.26 | 3.71 |
| Chitin + flax seed meal | 59.21 | 22.13 | 4.79 | 36.88 | 35.99 | 2.63 |
| LSD (p = 0.05) = | 8.28 | 6.78 | 4.66 | 6.39 | 7.96 | 1.57 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A polymer film useful in the delivery of biological agents which is comprised of a transparent, gelled water soluble polymer supported by a mesh, the size of the grids of which is in the range of from about 0.5 to 5.0 mm$^2$ mesh, and which film further contains a biological agent which comprises nematode eggs.

2. The polymer film of claim 1, wherein the mesh supporting the polymer film is a fiberglass screen.

3. The polymer film of claim 2, wherein the fiberglass screen is coated with polyvinyl chloride.

4. The polymer film of claim 1, wherein the size of the grids of the mesh supporting the polymer film is in the range of from about 1.0 to 2.0 mm$^2$ mesh.

5. The polymer film of claim 1, wherein the polymer is a gelled, hydrophilic colloidal polysaccharide.

6. The polymer film of claim 1, wherein the polymer is a gelled alginate polymer.

7. The polymer film of claim 1, wherein the polymer is a gelled carrageenan.

14. The method of claim 9, wherein the meshed support is a fiberglass screen.

15. The method of claim 14, wherein the fiberglass screen has grids of a mesh size ranging from about 1.0 to 2.0 mm$^2$ mesh.

16. The method of claim 9, wherein the polymer is gelled by dipping the mesh support having the film over the support into a gelling agent.

17. The method of claim 9, wherein the gellable water soluble polymer is a sodium alginate, the meshed support is a polyvinyl chloride coated fiberglass screen having a grid size in the range of from about 1.0 to 2.0 mm$^2$ mesh, and the polymer is gelled by dipping the mesh support covered with the film from step (ii) in a solution of calcium chloride.

18. A process for the delivery of a biological agent which comprises:

(i) preparing the polymer film of claim 1 containing the biological agent which comprises nematode eggs and (ii) delivering at least a portion of the polymer film to a desired location.

19. The process of claim 18, wherein the polymer film is delivered to soil.

20. The process of claim 18, wherein delivery of the polymer film is to plant roots.

21. A process for evaluating the microbial interactions of soil by a biological agent comprising (i) preparing the polymer film of claim 1 containing said biological agent comprising nematode eggs and (ii) delivering at least a portion of the polymer film into said soil, and (iii) observing how said biological agent is effected.

22. The method of claim 9, wherein the mesh support covered with the film created in step (ii) is pulled through two rods, to thereby form a film of uniform thickness, prior to gelling the polymer.

23. The method of claim 12, wherein the mesh support covered with the film created in step (ii) is pulled through two rods, to thereby form a film of uniform thickness, prior to gelling the polymer.

* * * * *